United States Patent [19]

Leistner

[11] Patent Number: 4,913,611

[45] Date of Patent: Apr. 3, 1990

[54] NAILING STRIP

[76] Inventor: Herbert E. Leistner, 167 Sweeney Drive, Toronto, Ontario, Canada, M4A 1V1

[21] Appl. No.: 288,995

[22] Filed: Dec. 23, 1988

[51] Int. Cl.⁴ .................. F16B 15/08; B65D 85/24
[52] U.S. Cl. ................................ 411/442; 206/345; 206/347
[58] Field of Search ............... 411/442, 443; 206/345, 206/346, 347, 339; 227/120, 137

[56] References Cited

U.S. PATENT DOCUMENTS

| | | | |
|---|---|---|---|
| 1,263,218 | 4/1918 | Fischer | 206/345 |
| 3,463,304 | 8/1969 | Gallee et al. | 206/346 |
| 3,736,198 | 5/1973 | Leistner . | |
| 4,167,229 | 9/1979 | Keusch et al. | 206/345 |
| 4,349,106 | 9/1982 | Bogel | 206/347 |
| 4,383,608 | 5/1983 | Potucek | 206/347 |
| 4,606,455 | 8/1986 | Grikis et al. | 206/347 |
| 4,679,975 | 7/1987 | Leistner . | |
| 4,684,022 | 8/1987 | Potucek | 206/347 |

Primary Examiner—Neill R. Wilson

[57] ABSTRACT

A nail strip for use in association with a power-operated nailing device having strip feeding pawls and having a plurality of nails arranged in parallel spaced-apart relation, thermoplastic collars formed around the nails, webs extending between adjacent collars formed integrally, of a like thermoplastic material, engagement surfaces defined by asymmetric shoulders formed on the collars for engagement by the strip feeding pawls, and, the webs lying in a common plane spaced to one side of the plane containing the shoulders.

6 Claims, 1 Drawing Sheet

NAILING STRIP

The invention relates to a device strip of nails, in which the nails are connected together by a web, for use in association with power-operated nailing devices.

BACKGROUND OF THE INVENTION

Power-operated nailing devices are well known in which the nails are associated together in a strip, and are fed from a magazine. One particularly advantageous form of such a nailing device employs a drum-shaped magazine in which the nails are stored in a generally spiral coil. This type of nailing device and magazine can accommodate a larger number of nails in the magazine, than is the case with nailing devices in which the nails must be inserted in a magazine which is essentially linear. In the linear type of magazine, the strip of nails must also be linear. There are severe practical limitations on the length of such a linear strip that can be employed without inconveniencing the operator of the device.

In the case of a spiral coil of nails, however, a generally cylindrical or drum-shaped form of magazine is employed, and consequently a much greater number of nails can be employed in the strip, without inconveniencing the operator.

It is known to secure the nails together in such a nailing strip by a variety of different media. In linear nailing strips it is known to employ lengths of wire, welded to the individual nails, and also to employ a plastic adhesive medium, and also in some cases nails are simply held together by paper tapes. All of these systems have various advantages and various drawbacks. In the case of coiled nails however in the past, the only practical and satisfactory form of medium has been two lengths of wire welded to the nails at spaced-apart intervals. The nails are welded on to the two wires, while moving along a linear path. The lengths of wire are cut at suitable intervals, and the nails are then coiled into coiled strips of the appropriate size. This system functions satisfactorily, insofar as it lends itself to efficient high speed production techniques, and effectively secures the nails in the strip, until they are delivered to the nailing device for insertion into a wooden work piece.

It is, however, known that the use of such wires may cause problems. In the operation of the nailing device, pieces of wire may become detached from a nail and may lodge in the device, causing it to malfunction.

In spite of these problems however, in the past, alternative media such as plastic materials, paper and the like have been considered as unsatisfactory for forming nails into a coiled nailing strip. One of the problems associated with the use of media other than wire, for joining nails, is the design of the feed mechanisms used in nailing devices for feeding nailing strips. The feed mechanisms employ feed pawls of a design which is adapted to drag the strip from the magazine, and feed the nails one by one into a barrel portion of the nailing device where they are then struck by a plunger. The shaping and design of the feed pawls employed in such nailing devices are such that it is necessary for them to make a positive engagement with the shank of each nail, from one side of the strip, while the other side of the strip is securely held against a wall in the feed mechanism. In the type of coil formed with wires, welded to the nail shanks, the welds provide a solid effective bond between the nails and the wires, on one side of the nail shank, while leaving the opposite sides of the nail shanks clear, and therefore free for engagement by the feed pawls.

In the past, attempts have been made to provide linear nailing strips in which the bonding media comprised extruded ribbons of plastic. Four such ribbons were extruded: two on one side of the nails; and two on the other side to provide two spaced apart parallel bonding strips of plastic material. In this system, the extruded ribbons of plastic, immediately after extrusion, were subjected to the action of forming dies, to compress the ribbons of plastic together between the nails, so that they formed an integral strip or web of material extending between adjacent nails. This system, however, has not proved to be suitable for use in all types of nailing devices employing coiled nail strips. The plastics material bonding the nails together interferes with the operation of the feed pawls, in some cases unless they are specially designed to accept them. The collars defined curving surfaces which prevented a secure contact being made by the feed pawls.

BRIEF SUMMARY OF THE INVENTION

With a view to overcoming the various problems mentioned above, the invention comprises a nail strip for use in association with a power-operated nailing device and having strip feeding means therein operable along a feed axis, said strip comprising a plurality of nails having shanks, and heads, and points, and wherein said shanks are arranged in parallel spaced-apart relation, thermoplastic collar means formed around each said nail shank, intermediate said point and said head, engagement surfaces on said collar means for engagement by said strip feeding means, web means extending between respective adjacent collar means and formed integrally therewith, of a like thermoplastic material, and said web means lying in a common plane spaced to one side of the plane containing said engagement surfaces.

It is a further objective of the invention to provide such a nail strip wherein said collar means, and said web means define outer surfaces remote from said nail shanks, said outer surfaces being adapted to lie along a planar surface.

It is a further objective of the invention to provide such a nail strip including ramp means formed on such collar means remote from said engagement surfaces.

The various features of novelty which characterize the invention are pointed out with more particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

IN THE DRAWINGS

DESCRIPTION OF A SPECIFIC EMBODIMENT

Figure 1:
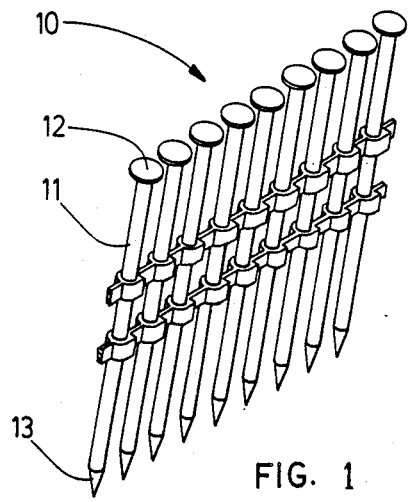
FIG. 1 is a perspective illustration of a nailing strip, in accordance with the invention.

Referring first of all to FIG. 1, it will be seen that the invention is shown in the form of a coiled strip of nails, a portion of which is indicated generally as 10. Such coiled nail strips are used in power-operated nailing devices. An example of such a coiled nail strip is shown in Canadian Letters Patent No. 1,206,442.

As is well known, such a nailing device incorporates a drum-shaped or generally cylindrical magazine. The coiled nailing strip is located in the magazine. It is progressively unwound and fed through the nailing device, as the nails are driven into the workpiece.

Such nailing devices are available from several different manufacturers. In general, they all incorporate a somewhat similar system of feed mechanism, for drawing the strip of nails progressively from the magazine. This feed mechanism feeds the leading end nail of the strip into a barrel portion of the device, with the nail in registration with a plunger. This plunger is then operated to seprate the endmost nail and drive it into the workpiece. The feed mechanism then operates to draw the trailing portion of the strip forwardly and bring the leading end nail into registration with the plunger once more. These feed mechanisms usually employ a system of feed pawls, or fingers which operate to engage and move the strip.

As is well known, the feed mechanism operates along a linear feed path, extending between the magazine and the barrel of the nailing device. The feed path is usually defined by means of an elongated chamber defining a narrow passageway sufficient to pass the nails in the strip, the axis of such passageway being usually diagonal to the access of the barrel.

The feed pawls or fingers will operate along the linear axis of the feed path. The nails themselves may lie on axes normal to the feed path, but more usually will be lying along axes which are diagonal to the axis of the feed path in order to arrive at the barrel itself so that they are aligned along the axis of the barrel.

It will thus be appreciated that, in many cases, the feed pawls will be engaging a nail usually at two spaced apart points along its shank, and will be forcing the nail along the feed path, with the nail lying diagonal to the axis of movement of the feed pawls.

Thus, there is a slight tendency for the feed pawls to slip along the nail, in this type of feed mechanism. Consequently a secure positive engagement must be provided between the feed pawls and the nail in order to provide satisfactory operation.

Figure 2:
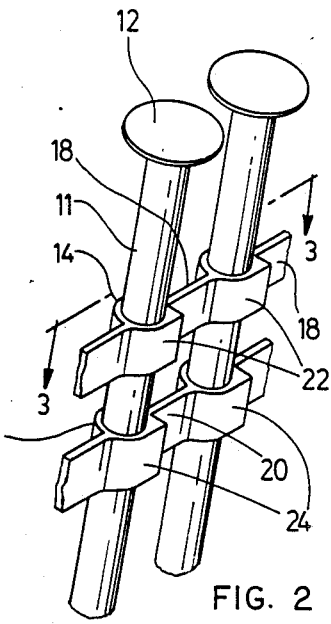
FIG. 2 is a perspective elevation of a portion of the nailing strip of FIG. 1, shown greatly enlarged.
Figure 4:
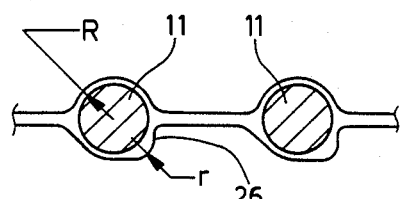
FIG. 4 is a sectional illustration of an alternate embodiment of the nailing strip.
Figure 3:
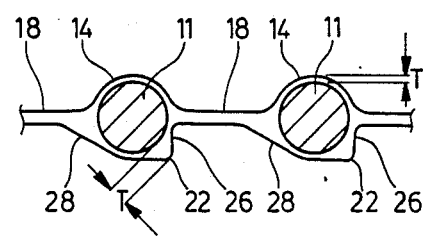
FIG. 3 is a section along the line 3—3 of FIG. 2.

In accordance with the invention, there is provided a nailing strip, shown in more detail in Figures 2 and 3. It will be seen to comprise a plurality of nails 11, having heads 12 and points 13, arranged in parallel spaced-apart location. Each nail is secured in the strip by collar means comprising, in this embodiment, two spaced-apart first and second collars 14 and 16 encircling the nail. Collars 14 and 16 are formed of thermoplastic material. The thermoplastic material is of such a type that it will readily separate when the nail is driven into the workpiece.

Web means, in this case, first and second webs 18 and 20, extend between respective collars 14—14 and 16—16 on adjacent nails. The webs 18-20 lie along axes which, in this embodiment, are diagonal to the nails N.

In this embodiment of the invention, webs 18 and 20 lie in a plane which is median to the plane containing the nails.

Webs 18 and 20 are made of the same thermoplastic material as that from which collars 14 and 16 are formed and are sufficiently flexible to permit bending and coiling. In a typical manufacturing operation, the collars 14 and 16 and first and second webs 18 and 20 are formed from four continuous extruded ribbons of thermoplastic, which are extruded along parallel spaced apart axes on opposite sides of the nail. The webs 18 and 20 are then formed by means of squeezing the two ribbons together between the respective collars 14 and 16, in a subsequent forming operation.

In this embodiment of the invention, first and second engagement means in the form of shoulders 22 and 24 are formed on collars 14 and 16, extending therefrom on one side of the nail strip.

The engagement means or shoulders 22 and 24 will be seen to define non-circular eccentric shapes and have engagement surfaces 26, which will provide secure engagement means for the feed pawls or fingers.

Slopes on ramps 28 are preferably, but not invariably, formed on the collars, on the sides opposite to the engagement surfaces. Ramps 28 serve to facilitate return movement of the feed pawls or fingers.

The slopes 28, and surfaces 26 thus define a continuous series of slopes and abutments of generally saw-tooth configuration. The pawls, on their return stroke, will slide easily up and over the slopes 28, and will then securely engage the surfaces 26 of shoulders 22 and 24, for the forward or feed stroke.

Collars 14 and 16 will have an average thickness t, and the shoulders 22 and 24 will have an average thickness T, equal to between 2 t and 4 t, when measured through the point of greatest thickness.

Shoulders 22 and 24 may define an angular corner, as shown in FIG. 3, or may define a radius r less than the radius R of the collars themselves.

Figure 5:
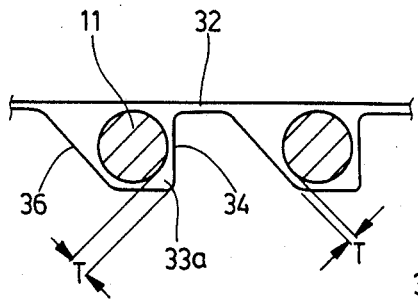
FIG. 5 is a sectional illustration of a further alternate embodiment.
Figure 6:
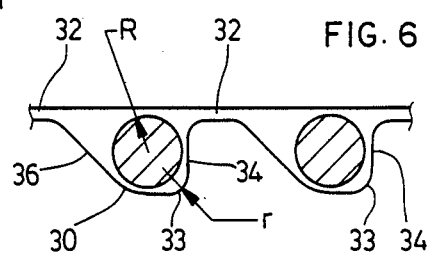
FIG. 6 is a sectional illustration of a further alternate embodiment.

A further embodiment of the invention is illustrated in FIG. 5, with a variation of the FIG. 5 embodiment illustrated in FIG. 6.

In the embodiments of FIGS. 5 and 6, the nails are provided with collars 30 and webs 32 joining respective adjacent collars 30.

In these embodiments, it will be noted that the webs 32 are offset relative to the plane containing the nails, and join or merge with the collars in a generally tangential fashion.

It will be seen that each of the collars in this case have shoulders 33 which define engagement surfaces indicated as 34, against which the feed pawls can engage during the feeding operation, and also define ramps 36.

The feed pawl is able to engage that portion of the collar lying in a plane which is median to the plane containing the nail shanks.

Shoulders 33 define generally radiused corners 38, wherein the radius r is less than the radius R of the collars themselves.

In FIG. 6, collar 30 has a thickness t, and shoulders 33a have a thickness T equal to between 2t and 4t.

In this embodiment the feed pawl is able to engage that portion of the collar lying in a plane which is median to the plane containing the nails shanks. The surface of the web means, and collars, remote from the engagement means, also provides a surface adapted to lie on a wall in feed mechanism of the nailing device.

The invention is also applicable to nail strips in which the nail heads are located either in one plane, i.e., with the heads in a common plane, or with the heads in offset planes, with the shanks diagonal to the webs joining them.

While two collars and webs are illustrated, a single collar and web could be used, or three or more collars and webs could be used for longer nails.

The foregoing is a description of a preferred embodiment of the invention which is given here by way of example only. The invention is not to be taken as limited to any of the specific feature as described, but comprehends all such variations thereof as come within the scope of the appended claims.

What is claimed is:

1. A nail strip for use in association with a power-operated nailing device and having a strip feed pawl means therein operable along a feed pawl axis, for advancing said nail strip through said device said strip defining a leading end and a trailing end portion and comprising:

a plurality of nails having heads, and points, and wherein said nails are arranged in parallel spaced-apart relation;

thermoplastic collar means molded around and encircling each said nail, intermediate said point and said head and defining a predetermined thickness;

web means molded integrally with and extending between adjacent said collar means and formed of a like thermoplastic material;

asymmetric shoulder means molded integrally with respective said collar means and extending outwardly from said collar means and defining a thickness greater than said predetermined thickness of said collar means, said shoulder means defining engagement surfaces lying in planes generally normal to said feed pawl axis and facing away from said leading end of said strip for engagement by said pawl means, and, said web means lying in a common plane spaced to one side of the plane containing said shoulder means whereby to leave said engagement surfaces free for unobstructed engagement by said feed pawl means.

2. A nail strip as claimed in claim 1 wherein said web means define an outer surface remote from said nails, said outer surface being adapted to lie along a planar surface.

3. A nail strip as claimed in claim 1 wherein said strip is formed into a coil.

4. A nail strip as claimed in claim 1 wherein said web means are oriented along axes diagonal to said nails.

5. A nail strip as claimed in claim 1 including ramp means formed on said collars.

6. A nail strip as claimed in claim 1 wherein said collar means has a predetermined thickness t, and wherein said shoulder means defines a thickness T, wherein T is between 2t and 4t.

* * * * *